United States Patent
Takahashi et al.

(10) Patent No.: US 7,128,428 B2
(45) Date of Patent: *Oct. 31, 2006

(54) ANTI-GLARE FILM

(75) Inventors: Hiroshi Takahashi, Himeji (JP);
Hiroaki Ushida, Izumiotsu (JP)

(73) Assignee: Daicel Chemical Industries, Ltd., Osaka (JP)

( * ) Notice: Subject to any disclaimer, the term of this patent is extended or adjusted under 35 U.S.C. 154(b) by 92 days.

This patent is subject to a terminal disclaimer.

(21) Appl. No.: 10/806,326

(22) Filed: Mar. 23, 2004

(65) Prior Publication Data

US 2004/0196558 A1    Oct. 7, 2004

(30) Foreign Application Priority Data

Apr. 3, 2003    (JP) ............................. 2003-100671

(51) Int. Cl.
*G02B 27/00*    (2006.01)
*G02F 1/1335*    (2006.01)
*C02C 5/06*    (2006.01)

(52) U.S. Cl. ..................... 359/601; 359/599; 349/86; 428/1.3

(58) Field of Classification Search ................ 359/599, 359/601–614, 707; 430/4–14; 428/1.3, 428/212
See application file for complete search history.

(56) References Cited

U.S. PATENT DOCUMENTS 6,064,524 A * 5/2000 Oka et al. .................... 359/582
6,177,153 B1 * 1/2001 Uchiyama et al. ........... 428/1.1
6,573,958 B1 * 6/2003 Takahashi et al. ............ 349/86
6,696,140 B1 * 2/2004 Suzuki ........................ 428/212
6,778,240 B1 * 8/2004 Nakamura et al. .......... 349/112
6,805,925 B1 * 10/2004 Uchida et al. ............... 428/1.3
6,945,656 B1 * 9/2005 Takahashi et al. .......... 359/601

FOREIGN PATENT DOCUMENTS

| JP | 2001-215307 | 8/2001 |
| JP | 2001-264508 | 9/2001 |
| JP | 2001-281411 | 10/2001 |

* cited by examiner

*Primary Examiner*—Thong Q Nguyen
(74) *Attorney, Agent, or Firm*—Birch, Stewart, Kolasch & Birch, LLP (57) ABSTRACT

An anti-glare film is obtained by forming a resin layer having a low refraction index on an anti-glare layer is obtained by coating a transparent plastic film with a liquid composition containing a polymer, a curable resin precursor, and a solvent, evaporating the solvent, forming a phase separation structure by spinodal decomposition, and curing the precursor with light irradiation. The anti-glare film has an uneven surface structure in the anti-glare layer, isotropically transmits and scatters an incident light to show the maximum value of the scattered light intensity at a scattering angle of 0.–10°, and has a total light transmittance of 70–100%. The film prevents dazzle or blur of images on a display surface, and reflection of a surrounding scenery, and improves contrast with reducing whitening of the display, even in a high definition display apparatus.

18 Claims, 2 Drawing Sheets

ANTI-GLARE FILM

This Nonprovisional application claims priority under 35 U.S.C. § 119(a) on Patent Application No(s). JP2003/100671 filed in JAPAN on Apr. 3, 2003, the entire contents of which are hereby incorporated by reference.

FIELD OF THE INVENTION

This invention relates to an anti-glare (glare proof) film (or anti-glare and antireflection film) which is suitable for effectively preventing dazzle or glare and reflection of an exterior light source in display surfaces of various display apparatuses (or devices) and has less-whitish to improve contrast of an image, and a process for producing the film, as well as an optical member with the film.

BACKGROUND OF THE INVENTION

To prevent reflection of a surrounding scenery in a display surface of a liquid crystal display apparatus or others, the display surface is usually kept away from regular reflection by coating or applying a mixture of a fine particle and a binder resin or curable resin on a support to form uneven (rough) structure on the surface, and is provided with anti-glareness. However, in a high definition display apparatus which has a small pixel size, a conventionally used surface-uneven size brings about debasement of an image such as dazzle (or glare) in display and blur (or indistinctness) of images. That is, in the case of a high definition display apparatus, a degree of a conventionally used surface-uneven size is close to that of the pixel size in the high definition display, and dazzle is generated due to a lens effect caused by the surface unevenness. Moreover, since the centroid position of the fine particles is unable to control in the inside and surface structures of a coat layer, the transmitted scattered-light distribution shows the Gaussian distribution with a central focus on a rectilinear transmitted light. In a conventional fine particle size, accordingly, the scatteration on the periphery of the rectilinear transmitted light increases, and the pixel border becomes vague or unclear, as a result blur (or clouding) of images occurs.

Therefore, there has been tried to minify a size of a fine particle to be added, or to control an uneven shape of the surface with the use of fine particles having a limited particle size distribution. In these manners, however, it is necessary for preventing dazzle or blur of images to control the centroid position of the fine particles. Moreover, since the uneven shape of the surface becomes smaller, compatibility of adequate anti-glareness is difficult to attain and there is disadvantage from the viewpoint of cost performance.

Japanese Patent Application Laid-Open No. 215307/2001 (JP-2001-215307A) discloses an anti-glare layer containing a transparent fine particle having the mean particle size of 15 μm in a coat layer whose thickness is not less than twice of the mean particle size, wherein the anti-glare layer has a surface having a finely uneven structure through unevenly distributing the transparent fine particles in one side being in touch with air of the coat layer. This literature also discloses the anti-glare layer supported by a transparent support film, and an optical member comprising the anti-glare layer in at least one side of a polarizing plate.

As a technique for disposing a low refraction index layer on a surface in order to express a low reflective power (or property), Japanese Patent Application Laid-Open No. 264508/2001 (JP-2001-264508A) discloses an anti-glare antireflection film comprising an anti-glare hardcoat layer and a low refraction index layer formed on a transparent support in this order, wherein the anti-glare hardcoat layer contains particles having a mean particle size of 1 to 10 μm, and the low refraction index layer contains inorganic fine particles having a mean particle size of 0.001 to 0.2 μm, a hydrolysate of a photo-curable organosilane and/or a partial condensate thereof and a fluorine-containing polymer, and has a refraction index of 1.35 to 1.49.

Japanese Patent Application Laid-Open No. 281411/2001 (JP-2001-281411A) discloses an anti-glare antireflection film having similar composition as that recited in Japanese Patent Application Laid-Open No. 264508/2001 (JP-2001-264508A), wherein the film has the visibility of a transmitted image using an optical slit of 0.5 mm width being 30 to 70%.

Also in such films, however, since the intensity distribution of the transmitted scattered-light is controlled with a particle size thereof, it is impossible to prevent dazzle or blur of images in the display surface effectively. Moreover, these films have a disadvantage from the viewpoint of cost performance due to using a special fine particle.

SUMMARY OF THE INVENTION

It is therefore an object of the present invention to provide an anti-glare film (or anti-glare and antireflection film) having a high anti-glareness (anti-dazzle property), preventing reflection of a surrounding scenery and dazzle on a display surface even in a high definition display apparatus, and efficiently preventing reflection of an exterior light on a display surface, and a process for producing the anti-glare film, as well as an optical member (or polarizing plate) and a display apparatus or device (liquid crystal display apparatus, plasma display, touch panel-equipped display (or input) device) with the anti-glare film.

It is another object of the present invention to provide an anti-glare film being capable of preventing blur of images on a display surface even in a high definition display apparatus, and having less-whitish to realize high contrast in the display, and a process for producing the anti-glare film, as well as an optical member and a display apparatus or device with the anti-glare film.

It is still another object of the invention to inexpensively provide an anti-glare film having high abrasion resistance and being useful for controlling the intensity distribution of the transmitted scattered-light, and a process for producing the anti-glare film, as well as an optical member and a display apparatus or device with the anti-glare film.

The inventors of the present invention made intensive studies to achieve the above objects and finally found that, in a process which comprises preparing a solution of at least one polymer and at least one curable resin precursor uniformly dissolved in a solvent and evaporating the solvent from the solution to produce a sheet, spinodal decomposition under an appropriate condition followed by curing (or hardening) the precursor ensures a phase-separation structure having regularity and an uneven surface structure corresponding to the phase structure. Further, the inventors found that attachment of a laminated product of such an anti-glare layer (anti-glare hardcoat layer) having a regular phase-separation structure and a resin layer having a low refraction index (low refraction index layer) to a high definition display apparatus ensures effective elimination of dazzle and blur of images in the display surface, and that disposing a low refraction index layer to the top layer represses reflection of an exterior light in the surface to inhibit whitening of the display. Furthermore, the inventors found that high contract image can be consequently displayed. The present invention was accomplished based on the above findings.

DETAILED DESCRIPTION OF THE INVENTION

[Anti-glare Film (Anti-glare and Antireflection Film)]

The anti-glare (glare proof or anti-dazzle) film comprises at least an anti-glare layer and a resin layer having a low refraction index (low refraction index layer), and a phase separation structure (phase-separated structure) of the anti-glare layer is formed by spinodal decomposition from a liquid phase (wet spinodal decomposition). That is, by using a resin composition of the present invention which contains a polymer, a curable resin precursor and a solvent, during a step of evaporating or removing a solvent from a liquid phase (or a uniform solution or a coat layer thereof) in the resin composition with drying or other means, a phase separation by spinodal decomposition can be generated depending on condensation of the liquid phase, and a phase-separated structure in which the distance between phases is relatively regular can be formed. More specifically, the above-mentioned wet spinodal decomposition can be usually carried out by coating a support with a liquid mixture or resin composition (uniform solution) containing at least one polymer, at least one curable resin precursor and a solvent, and by evaporating the solvent from the coat layer. In the case using a separable (or releasable) substrate as the support, an anti-glare film composed of an anti-glare layer and a low refraction index layer (or a layer low in refraction index) can be obtained by laminating (or layering) the low refraction index layer on the anti-glare layer and then separating (or releasing) the support from the anti-glare layer, or by separating (or releasing) the anti-glare layer from the support and then laminating (or layering) the low refraction index layer on the anti-glare layer. Moreover, an anti-glare film having a lamination structure composed of a support, an anti-glare layer and a low refraction index layer can be obtained with the use of a non-separable (or non-releasable) support (preferably a transparent support) as the support.

The anti-glare film isotropically transmits and scatters an incident light to show the maximum value of the scattered light intensity at a scattering angle of 0.1 to 10° (preferably 1 to 10°), and has a total light transmittance of 70 to 100% (preferably 80 to 100%). That is, a light transmitted and scattered through the anti-glare layer (transmitted scattered-light) has a scattenng peak separated from a rectilinear transmitted light. The anti-glare film may have a visibility of a transmitted image of about 70 to 100% measured by an image clarity measuring apparatus provided with an optical slit of 0.5 mm width, and may have a haze of about 10 to 60% (preferably about 20 to 50%).

The anti-glare layer comprises at least one polymer and at least one curable resin precursor, and in the layer, at least two components selected from the group consisting of the polymers and the precursors (for example, (i) a plurality of polymers, (ii) a combination of a polymer and a curable resin precursor, or (iii) a plurality of curable resin precursors) are/is phase-separated by spinodal decomposition from a liquid phase, and the precursor is cured (or hardened).

The polymer may comprise a plurality of polymers being phase-separable from each other by spinodal decomposition (for example, a combination of a cellulose derivative with a styrenic resin, a (meth)acrylic resin, an alicyclic olefinic resin, a polycarbonate-series resin, a polyester-series resin, and the like), and the curable resin precursor being compatible with at least one polymer of the plurality of polymers.

At least one polymer of the plurality of polymers may have a functional group (for example, a polymerizable group such as a (meth)acryloyl group) participating in (or associating with) a curing reaction of the curable resin precursor. The curable resin precursor may comprise, for example, an epoxy (meth)acrylate, a urethane (meth)acrylate, a polyester (meth)acrylate, a silicone (meth)acrylate, a polyfunctional monomer having at least two polymerizable unsaturated bonds, and others.

Incidentally, the thermoplastic resin and the curable resin precursor are usually incompatible with each other. Further, hardcoat properties (or abrasion resistance) may be imparted to the anti-glare layer by the cured resin, or the anti-glare layer may have a regular or periodical phase-separation structure fixed by the cured resin. The anti-glare layer may, for example, be cured with a curing (or hardening) means such as an actinic ray (e.g., an ultraviolet ray, an electron beam), a thermal source, and other means. Moreover, the anti-glare layer usually comprises a polymer and a cured resin, and the weight ratio of the former relative to the latter may be about 5/95 to 60/40.

The low refraction index layer may be formed with a resin having a refraction index of 1.36 to 1.49. The low refraction index layer may comprise a fluorine-containing compound (e.g., a fluorine-containing resin precursor, or a cured fluorine-containing resin precursor). Moreover, the low refraction index layer may comprise a curable fluorine-containing resin precursor, and the precursor may be cured with at least one curing means selected from the group consisting of an actinic ray and a thermal source.

The anti-glare film may comprise an anti-glare layer and a low refraction index layer, or may comprise a transparent support (or substrate) (e.g., a transparent polymer film for forming an optical member), an anti-glare layer formed on the transparent support (or substrate), and a low refraction index layer formed on the anti-glare layer.

In the present invention, an optical member (or a laminated optical member) can be obtained by laminating the anti-glare film on at least one light path surface (or one side) of an optical element (such as a polarizing plate). The optical member ensures prevention of dazzle and an exterior light reflection on a display surface and impartment of high abrasion resistance to the optical element (such as a polarizing plate) by using the anti-glare film instead of a protective film for the optical element (e.g., a protective film for both sides of a polarizing plate). The film of the present invention is, accordingly, also preferably utilized for a display device or apparatus such as a liquid crystal display apparatus, a plasma display and a touch panel-equipped input device.

The present invention also includes a composition for an anti-glare film which comprises at least one polymer and at least one curable resin precursor, and in which at least two components selected from the group consisting of the polymers and the precursors are phase-separable by spinodal decomposition from a liquid phase. The composition may comprise a plurality of polymers being phase-separable by spinodal decomposition, and the curable resin precursor being compatible with at least one polymer of the plurality of polymers. At least one polymer of the plurality of polymers may have a functional group participating (or reacting) in a curing reaction of the curable resin precursor.

A process for producing the anti-glare film comprising at least an anti-glare layer may, for example, comprise forming a phase separation structure by spinodal decomposition from a liquid phase, curing the resin precursor to form the anti-glare layer, and the liquid phase contains at least one polymer, at least one curable resin precursor, and a solvent. The above-mentioned spinodal decomposition from a liquid phase may be carried out by evaporating the solvent. For forming a phase separation structure, (i) a plurality of polymers, (ii) a combination of a polymer and a curable resin precursor, or (iii) a plurality of curable resin precursors may be used. The process may comprise phase-separating a composition comprised of a thermoplastic resin, a photo-curable compound (such as a photo-curable monomer or oligomer), a photopolymerization initiator, and a solvent (common solvent) for dissolving the thermoplastic resin and the photo-curable compound; and curing the resin precursor by a light irradiation.

Moreover, the process may comprise phase-separating a composition comprised of a thermoplastic resin, a resin being incompatible with the thermoplastic resin and having a photo-curable group, a photo-curable compound, a photopolymerization initiator, and a solvent for dissolving the resin and the photo-curable compound; and curing the resin precursor by a light irradiation. In these processes, at least one anti-glare layer may be formed on a transparent support, and a resin layer having a low refraction index may be formed on the anti-glare layer.

(Polymer Component)

As a polymer component, a thermoplastic resin is usually employed. As the thermoplastic resin, there may be exemplified a styrenic resin, a (meth)acrylic resin, an organic acid vinyl ester-series resin, a vinyl ether-series resin, a halogen-containing resin, an olefinic resin (including an alicyclic olefinic resin), a polycarbonate-series resin, a polyester-series resin, a polyamide-series resin, a thermoplastic polyurethane resin, a polysulfone-series resin (e.g., a polyether sulfone, a polysulfone), a polyphenylene ether-series resin (e.g., a polymer of 2,6-xylenol), a cellulose derivative (e.g., a cellulose ester, a cellulose carbamate, a cellulose ether), a silicone resin (e.g., a polydimethylsiloxane, a polymethylphenylsiloxane), a rubber or elastomer (e.g., a diene-series rubber such as a polybutadiene or a polyisoprene, a styrene-butadiene copolymer, an acrylonitrile-butadiene copolymer, an acrylic rubber, a urethane rubber, a silicone rubber), and the like. These thermoplastic resins may be used singly or in combination.

The styrenic resin includes a homo- or copolymer of a styrenic monomer (e.g. a polystyrene, a styrene-α-methylstyrene copolymer, a styrene-vinyl toluene copolymer) and a copolymer of a styrenic monomer and other polymerizable monomer [e.g., a (meth)acrylic monomer, maleic anhydride, a maleimide-series monomer, a diene]. The styrenic copolymer includes, for example, a styrene-acrylonitrile copolymer (AS resin), a copolymer of styrene and a (meth)acrylic monomer [e.g., a styrene-methyl methacrylate copolymer, a styrene-methyl methacrylate-(meth)acrylate copolymer, a styrene-methyl methacrylate-(meth)acrylic acid copolymer], and a styrene-maleic anhydride copolymer. The preferred styrenic resin includes a polystyrene, a copolymer of styrene and a (meth)acrylic monomer [e.g., a copolymer comprising styrene and methyl methacrylate as a main component, such as a styrene-methyl methacrylate copolymer], an AS resin, a styrene-butadiene copolymer and the like.

As the (meth)acrylic resin, a homo- or copolymer of a (meth)acrylic monomer, and a copolymer of a (meth)acrylic monomer and a copolymerizable monomer may be employed. As the (meth)acrylic monomer, there may be mentioned, for example, (meth)acrylic acid; a $C_{1-10}$alkyl (meth)acrylate such as methyl (meth)acrylate, ethyl (meth)acrylate, butyl (meth)acrylate, t-butyl (meth)acrylate, isobutyl (meth)acrylate, hexyl (meth)acrylate, octyl (meth)acrylate and 2-ethylhexyl (meth)acrylate; an aryl (meth)acrylate such as phenyl (meth)acrylate; a hydroxyalkyl (meth)acrylate such as hydroxyethyl (meth)acrylate and hydroxypropyl (meth)acrylate; glycidyl (meth)acrylate; an N,N-dialkylaminoalkyl (meth)acrylate; (meth)acrylonitrile; a (meth)acrylate having an alicyclic hydrocarbon group such as tricyclodecane. The copolymerizable monomer includes the above styrenic monomer, a vinyl ester-series monomer, maleic anhydride, maleic acid, and fumaric acid. These monomers may be used singly or in combination.

As the (meth)acrylic resin, there may be mentioned a poly(meth)acrylate such as a poly(methyl methacrylate), a methyl methacrylate-(meth)acrylic acid copolymer, a methyl methacrylate-(meth)acrylate copolymer, a methyl methacrylate-acrylate-(meth)acrylic acid copolymer, and a (meth)acrylate-styrene copolymer (MS resin). The preferred (meth)acrylic resin includes a methyl methacrylate-series resin containing a poly($C_{1-6}$alkyl (meth)acrylate) such as a poly(methyl (meth)acrylate), particularly methyl methacrylate, as a main component (about 50 to 100% by weight, and preferably about 70 to 100% by weight).

As the organic acid vinyl ester-series resin, there may be mentioned a homo- or copolymer of a vinyl ester-series monomer (e.g., a polyvinyl acetate, a polyvinyl propionate), a copolymer of a vinyl ester-series monomer and a copolymerizable monomer (e.g., an ethylene-vinyl acetate copolymer, a vinyl acetate-vinyl chloride copolymer, a vinyl acetate-(meth)acrylate copolymer), or a derivative thereof. The derivative of the vinyl ester-series resin includes a polyvinyl alcohol, an ethylene-vinyl alcohol copolymer, a polyvinyl acetal resin, and the like.

As the vinyl ether-series resin, a homo- or copolymer of a vinyl $C_{1-10}$alkyl ether such as vinyl methyl ether, vinyl ethyl ether, vinyl propyl ether and vinyl t-butyl ether, and a copolymer of a vinyl $C_{1-10}$alkyl ether and a copolymerizable monomer (e.g., a vinyl alkyl ether-maleic anhydride copolymer).

The halogen-containing resin includes a polyvinyl chloride, a polyvinylidene fluoride, a vinyl chloride-vinyl acetate copolymer, a vinyl chloride-(meth)acrylate copolymer, a vinylidene chloride-(meth)acrylate copolymer, and the like.

The olefinic resin includes, for example, an olefinic homopolymer such as a polyethylene and a polypropylene, a copolymer such as an ethylene-vinyl acetate copolymer, an ethylene-vinyl alcohol copolymer, an ethylene-(meth)acrylic acid copolymer and an ethylene-(meth)acrylate copolymer. As the alicyclic olefinic resin, there may be mentioned a homo- or copolymer of a cyclic olefin such as norbornene and dicyclopentadiene (e.g., a polymer having an alicyclic hydrocarbon group such as tricyclodecane which is sterically rigid), a copolymer of the cyclic olefin and a copolymerizable monomer (e.g., an ethylene-norbornene copolymer, a propylene-norbornene copolymer). The alicyclic olefinic resin is available as, for example, the trade name "ARTON", the trade name "ZEONEX" and the like.

The polycarbonate-series resin includes an aromatic polycarbonate based on a bisphenol (e.g., bisphenol A), an aliphatic polycarbonate such as diethylene glycol bisallyl carbonate, and others.

The polyester-series resin includes an aromatic polyester obtainable from an aromatic dicarboxylic acid such as terephthalic acid (a homopolyester, e.g. a poly$C_{2-4}$alkylene terephthalate such as a polyethylene terephthalate and a polybutylene terephthalate, a poly$C_{2-4}$alkylene naphthalate, and a copolyester comprising a $C_{2-4}$alkylene arylate unit (a $C_{2-4}$alkylene terephthalate unit and/or a $C_{2-4}$alkylene naphthalate unit) as a main component (e.g., not less than 50% by weight). The copolyester includes a copolyester in which, in constituting units of a poly$C_{2-4}$alkylene arylate, part of $C_{2-4}$alkylene glycols is substituted with a polyoxy$C_{2-4}$alkylene glycol, a $C_{6-10}$alkylene glycol, an alicyclic diol (e.g., cyclohexane dimethanol, hydrogenated bisphenol A), a diol having an aromatic ring (e.g., 9,9-bis(4-(2-hydroxyethoxy)phenyl)fluorene having a fluorenone side chain, a bisphenol A, a bisphenol A-alkylene oxide adduct) or the like, and a copolyester in which, in constituting units, part of aromatic dicarboxylic acids is substituted with an unsymmetric aromatic dicarboxylic acid such as phthalic acid and isophthalic acid, an aliphatic $C_{6-12}$dicarboxylic acid such as adipic acid or the like. The polyester-series resin also includes a polyarylate-series resin, an aliphatic polyester obtainable from an aliphatic dicarboxylic acid such as adipic acid, and a homo- or copolymer of a lactone such as ε-caprolactone. The preferred polyester-series resin is usually a non-crystalline resin, such as a non-crystalline copolyester (e.g., a $C_{2-4}$alkylene arylate-series copolyester).

The polyamide-series resin includes an aliphatic polyamide such as nylon 46, nylon 6, nylon 66, nylon 610, nylon 612, nylon 11 and nylon 12, and a polyamide obtainable from a dicarboxylic acid (e.g., terephthalic acid, isophthalic acid, adipic acid) and a diamine (e.g., hexamethylenediamine, metaxylylenediamine). The polyamide-series resin may be a homo- or copolymer of a lactam such as ε-caprolactam, and is not limited to a homopolyamide but may be a copolyamide.

Among the cellulose derivatives, the cellulose ester includes, for example, an aliphatic organic acid ester of a cellulose (e.g., a $C_{1-6}$oraganic acid ester of a cellulose such as a cellulose acetate (e.g., a cellulose diacetate, a cellulose triacetate), a cellulose propionate, a cellulose butyrate, a cellulose acetate propionate, and a cellulose acetate butyrate), an aromatic organic acid ester of a cellulose (e.g. a $C_{7-12}$aromatic carboxylic acid ester of a cellulose such as a cellulose phthalate and a cellulose benzoate), an inorganic acid ester of a cellulose (e.g., a cellulose phosphate, a cellulose sulfate), and may be a mixed acid ester of a cellulose such as a cellulose acetate nitrate. The cellulose derivative also includes a cellulose carbamate (e.g. a cellulose phenylcarbamate), a cellulose ether (e.g., a cyanoethylcellulose; a hydroxy$C_{2-4}$alkyl cellulose such as a hydroxyethyl cellulose and a hydroxypropyl cellulose; a $C_{1-6}$alkyl cellulose such as a methyl cellulose and an ethyl cellulose; a carboxymethyl cellulose or a salt thereof, a benzyl cellulose, an acetyl alkyl cellulose).

The preferred thermoplastic resin includes, for example, a styrenic resin, a (meth)acrylic resin, a vinyl acetate-series resin, a vinyl ether-series resin, a halogen-containing resin, an alicyclic olefinic resin, a polycarbonate-series resin, a polyester-series resin, a polyamide-series resin, a cellulose derivative, a silicone-series resin, and a rubber or elastomer, and the like. As the thermoplastic resin, there is usually employed a resin which is non-crystalline and is soluble in an organic solvent (particularly a common solvent for dissolving a plurality of polymers and curable compounds). In particular, a resin which is excellent in moldability or film-forming (film-formable) properties, transparency, and weather resistance [for example, a styrenic resin, a (meth)acrylic resin, an alicyclic olefinic resin, a polyester-series resin, a cellulose derivative (e.g., a cellulose ester)] is preferred.

As the polymer (or thermoplastic resin), there may be also used a polymer having a functional group participating (or reacting) in a curing reaction (or a functional group capable of reacting with the curable precursor). Such a polymer may have the functional group in a main chain thereof, or in a side chain thereof. The functional group may be introduced into a main chain of the polymer with co-polymerization, co-condensation or the like, and is usually introduced into a side chain of the polymer. Such a functional group includes a condensable or reactive functional group (for example, a hydroxyl group, an acid anhydride group, a carboxyl group, an amino or imino group, an epoxy group, a glycidyl group, and an isocyanate group), a polymerizable functional group [for example, a $C_{2-6}$alkenyl group such as vinyl, propenyl, isopropenyl, butenyl and allyl, a $C_{2-6}$alkynyl group such as ethynyl, propynyl and butynyl, a $C_{2-6}$alkenylidene group such as vinylidene, or a functional group having the polymerizable functional group(s) (e.g., (meth)acryloyl group)], and others. Among these functional groups, the polymerizable functional group is preferred.

The thermoplastic resin having a polymerizable functional group in a side chain thereof may for example be produced by allowing to react (i) a thermoplastic resin having a reactive group (e.g., a group similar to the functional group exemplified in the paragraph of the condensable or reactive functional group) with (ii) a compound (polymerizable compound) having a group (reactive group) reactive to the reactive group of the thermoplastic resin, and a polymerizable functional group to introduce the polymerizable functional group of the compound (ii) into the thermoplastic resin.

Examples of the thermoplastic resin (i) having the reactive group include a thermoplastic resin having a carboxyl group or an acid anhydride group thereof [for example, a (meth)acrylic resin (e.g., a (meth)acrylic acid-(meth)acrylate copolymer such as a methyl methacrylate-(meth)acrylic acid copolymer, a methyl methacrylate-acrylate-(meth)acrylic acid copolymer), a polyester-series resin or polyamide-series resin having a terminal carboxyl group], a thermoplastic resin having a hydroxyl group [for example, a (meth)acrylic resin (e.g., a (meth)acrylate-hydroxyalkyl (meth)acrylate copolymer), a polyester-series resin or polyurethane-series resin having a terminal hydroxyl group, a cellulose derivative (e.g., a hydroxy$C_{2-4}$alkyl cellulose such as a hydroxyethyl cellulose and a hydroxypropyl cellulose), a polyamide-series resin (e.g., an N-methylolacrylamide copolymer)], a thermoplastic resin having an amino group (e.g., a polyamide-series resin having a terminal amino group), and a thermoplastic resin having an epoxy group [e.g., a (meth)acrylic resin or polyester-series resin having an epoxy group (such as a glycidyl group)]. Moreover, as the thermoplastic resin (i) having the reactive group, there may be used a resin obtained by introducing the reactive group into a thermoplastic resin (such as a styrenic resin or an olefinic resin, and an alicyclic olefinic resin) with copolymerization or graft polymerization. Among these thermoplastic resins (i), a thermoplastic resin having a carboxyl group or an acid anhydride group thereof, a hydroxyl group or a glycidyl group (particularly a carboxyl group or an acid anhydride group thereof), as a reactive group, is preferred. Incidentally, among the (meth)acrylic resins, the copolymer preferably contains (meth)acrylic acid at a proportion of not less than 50 mol %. These thermoplastic resins (i) may be used singly or in combination.

The reactive group of the polymerizable compound (ii) includes a group reactive to the reactive group of the thermoplastic resin (i), for example, includes a functional group similar to the condensable or reactive functional group exemplified in the paragraph of the functional group of the polymer mentioned above.

Examples of the polymerizable compound (ii) include a polymerizable compound having an epoxy group [e.g., an epoxy group-containing (meth)acrylate (an epoxy$C_{3-8}$alkyl (meth)acrylate such as glycidyl (meth)acrylate and 1,2-epoxybutyl (meth)acrylate; an epoxycyclo$C_{5-8}$alkenyl (meth)acrylate such as epoxycyclohexenyl (meth)acrylate), allyl glycidyl ether], a compound having a hydroxyl group [for example, a hydroxyl group-containing (meth)acrylate, e.g., a hydroxy$C_{2-4}$alkyl (meth)acrylate such as hydroxypropyl (meth)acrylate; a $C_{2-6}$alkylene glycol mono(meth)acrylate such as ethylene glycol mono(meth)acrylate], a polymerizable compound having an amino group [e.g., an amino group-containing (meth)acrylate (such as a $C_{3-6}$alkenylamine such as allylamine); an aminostyrene such as 4-aminostyrene and diaminostyrene], a polymerizable compound having an isocyanate group [e.g., a (poly)urethane (meth) acrylate, or vinylisocyanate], and a polymerizable compound having a carboxyl group or an acid anhydride group thereof [e.g., an unsaturated carboxylic acid or an anhydride thereof, such as (meth)acrylic acid and maleic anhydride]. These polymerizable compounds (ii) may be used singly or in combination.

Incidentally, the combination of the reactive group of the thermoplastic resin (i) with the reactive group of the polymerizable compound (ii) includes, for example, the following combinations.

(i-1) the reactive group of the thermoplastic resin (i): carboxyl group or acid anhydride group thereof,
the reactive group of the polymerizable compound (ii): epoxy group, hydroxyl group, amino group, isocyanate group;

(i-2) the reactive group of the thermoplastic resin (i): hydroxyl group,
the reactive group of the polymerizable compound (ii): carboxyl group or acid anhydride group thereof, isocyanate group;

(i-3) the reactive group of the thermoplastic resin (i): amino group,
the reactive group of the polymerizable compound (ii): carboxyl group or acid anhydride group thereof, epoxy group, isocyanate group; and (i-4) the reactive group of the thermoplastic resin (i): epoxy group,
the reactive group of the polymerizable compound (ii): carboxyl group or acid anhydride group thereof, amino group.

Among the polymerizable compounds (ii), an epoxy group-containing polymerizable compound (such as an epoxy group-containing (meth)acrylate) is particularly preferred.

The functional group-containing polymer, e.g., a polymer in which a polymerizable unsaturated group is introduced into part of carboxyl groups in a (meth)acrylic resin, is for example available as "CYCLOMER-P" from Daicel Chemical Industries, Ltd. Incidentally, "CYCLOMER-P" is a (meth)acrylic polymer in which epoxy group(s) of 3,4-epoxycyclohexenylmethyl acrylate is allowed to react with part of carboxyl groups of a (meth)acrylic acid-(meth) acrylate copolymer for introducing photo-polymerizable unsaturated group(s) in the side chain.

The amount of the functional group (particularly the polymerizable group), which participates in (or associates with) a curing reaction and is introduced into the thermoplastic resin, is about 0.001 to 10 mol, preferably about 0.01 to 5 mol, and more preferably about 0.02 to 3 mol relative to 1 kg of the thermoplastic resin.

These polymers may be used in a suitable combination. That is, the polymer may comprise a plurality of polymers. The plurality of polymers may be capable of phase separation by spinodal decomposition from a liquid phase. Moreover, the plurality of polymers may be incompatible with each other. In the case combining a plurality of polymers, the combination of a first resin with a second resin is not particularly limited, and a plurality of polymers incompatible with each other in the neighborhood of a processing temperature, for example two polymers incompatible with each other, may be used in a suitable combination. For example, in the case where a first polymer is a cellulose derivative (e.g., a cellulose ester such as cellulose acetate propionate), a second polymer may be a styrenic resin (e.g., a polystyrene, a styrene-acrylonitrile copolymer), a (meth) acrylic resin, an alicyclic olefinic resin (e.g., a polymer obtained by using norbornene as a monomer), a polycarbonate-series resin, a polyester-series resin (e.g., the above-mentioned poly$C_{2-4}$alkylene arylate-series copolyester), and others. Moreover, for example, in the case where the first polymer is a styrenic resin (e.g., a polystyrene, a styrene-acrylonitrile copolymer), the second polymer may be a cellulose derivative (e.g., a cellulose ester such as a cellulose acetate propionate), a (meth)acrylic resin (e.g., a poly(methyl methacrylate)), an alicyclic olefinic resin (e.g., a polymer obtained by using norbornene as a monomer), a polycarbonate-series resin, a polyester-series resin (e.g., the above-mentioned poly$C_{2-4}$alkylene arylate-series copolyester), and others. In the combination of a plurality of resins, there may be used at least a cellulose ester (for example, a $C_{2-4}$alkylcarboxylic acid ester of a cellulose such as a cellulose diacetate, a cellulose triacetate, a cellulose acetate propionate, or a cellulose acetate butyrate).

Incidentally, in the case where a plurality of polymers has high compatibility, these polymers fail to generate effective phase separation during a drying step for evaporating the solvent, and as a result the layer obtained therefrom sometimes deteriorates functions as an anti-glare layer. The phase separability among a plurality of polymers can be judged conveniently by visually conforming whether the residual solid content becomes clouded or not during a step of preparing a uniform solution with a good solvent to both components and gradually evaporating the solvent.

Incidentally, the phase separation structure generated by spinodal decomposition is finally cured with an actinic ray (e.g., an ultraviolet ray, an electron beam), a thermal source or other means to form a cured resin. By final curing, the anti-glare layer forms a hardcoat layer. Accordingly, abrasion resistance can be imparted to the anti-glare layer, and durability of the layer can be improved.

From the viewpoint of abrasion resistance after curing, at least one of the plurality of polymers, e.g., one of polymers incompatible with each other (in the case using a first resin with a second resin in combination, particularly both polymers) is preferably a polymer having a functional group, reactive to the curable resin precursor, in a side chain thereof.

The ratio (weight ratio) of the first polymer relative to the second polymer [the former/the latter] may for example be selected within the range of about 1/99 to 99/1, preferably about 5/95 to 95/5 and more preferably about 10/90 to 90/10, and is usually about 20/80 to 80/20, particularly about 30/70 to 70/30.

Incidentally, the polymer for forming a phase separation structure may comprise the thermoplastic resin or other polymer(s) in addition to the above-mentioned two polymers incompatible with each other.

The glass transition temperature of the polymer may for example be selected within the range of about −100° C. to 250° C., preferably about −50° C. to 230° C., and more preferably about 0° C. to 200° C. (for example, about 50° C. to 180° C.).

It is advantageous from the viewpoint of surface hardness that the glass transition temperature is not less than 50° C. (e.g., about 70° C. to 200° C.), and preferably not less than 100° C. (e.g., about 100° C. to 170° C.). The weight-average molecular weight of the polymer may for example be selected within the range of not more than 1,000,000, and preferably about 1,000 to 500,000.

(Curable Resin Precursor)

As the curable resin precursor, there may be used various curable compounds having a reactive functional group by a thermal source or an actinic ray (e.g., an ultraviolet ray, an electron beam), and being capable of forming a resin (particularly a cured or crosslinked resin) by curing or crosslinking with a thermal source or an actinic ray.

For example, as the resin precursor, there may be mentioned a thermosetting compound or resin [a low molecular weight compound (or prepolymer such as a low molecular weight resin (e.g., an epoxy-series resin, an unsaturated polyester-series resin, a urethane-series resin, and a silicone-series resin)) having an epoxy group, an isocyanate group, an alkoxysilyl group, a silanol group, a polymerizable group (such as vinyl group, allyl group, and (meth)acryloyl group), or others], and a photo-curable compound which is curable with an actinic ray (such as ultraviolet ray) (e.g., an ultraviolet curable compound such as a photo-curable monomer, oligomer, or prepolymer). The photo-curable compound may be an EB (electron beam) curable compound, or others. Incidentally, a photo-curable compound such as a photo-curable monomer or oligomer, and a photo-curable resin which may have low molecular weight are sometimes simply referred to as "photo-curable resin". These curable resin precursors may be used singly or in combination.

The photo-curable compound usually has a photo-curable group, for example, a polymerizable group (e.g., vinyl group, allyl group, (meth)acryloyl group) or a photosensitive group (e.g., cinnamoyl group), and in particular, is preferably a photo-curable compound having a polymerizable group [e.g., a monomer, an oligomer (or resin, particularly a low molecular weight resin)]. These photo-curable compounds may be used singly or in combination.

Among the photo-curable compounds having a polymerizable group, as the monomer, for example, there may be exemplified a monofunctional monomer [for example, a (meth)acrylic monomer such as a (meth)acrylic ester, e.g., an alkyl (meth)acrylate (e.g., a $C_{1-6}$alkyl (meth)acrylate such as methyl (meth)acrylate), a cycloalkyl (meth)acrylate, a (meth)acrylate having a crosslinked cyclic hydrocarbon group (e.g., isobornyl (meth)acrylate, adamantyl (meth)acrylate), glycidyl (meth)acrylate; a vinyl-series monomer such as a vinyl ester (e.g., vinyl acetate) or vinylpyrrolidone], a polyfunctional monomer having at least two polymerizable unsaturated bonds [for example, an alkylene glycol di(meth)acrylate such as ethylene glycol di(meth)acrylate, propylene glycol di(meth)acrylate, butanediol di(meth)acrylate, neopentyl glycol di(meth)acrylate, and hexanediol di(meth)acrylate; a (poly)oxyalkylene glycol di(meth)acrylate such as diethylene glycol di(meth)acrylate, dipropylene glycol di(meth)acrylate, and a polyoxytetramethylene glycol di(meth)acrylate; a di(meth)acrylate having a crosslinked cyclic hydrocarbon group (e.g., tricyclodecane dimethanol di(meth)acrylate, and adamantane di(meth)acrylate); and a polyfunctional monomer having about 3 to 6 polymerizable unsaturated bonds (e.g., trimethylol propane tri(meth)acrylate, trimethylol ethane tri(meth)acrylate, pentaerythritol tri(meth)acrylate, pentaerythritol tetra(meth)acrylate, and dipentaerythritol penta(meth)acrylate)].

Among the photo-curable compound having a polymerizable group, examples of the oligomer or resin include a (meth)acrylate of a bisphenol A added with an alkylene oxide, an epoxy (meth)acrylate (e.g., a bisphenol A-based epoxy (meth)acrylate, and a novolak-based epoxy (meth) acrylate), a polyester (meth)acrylate (e.g., an aliphatic polyester-based (meth)acrylate, and an aromatic polyester-based (meth)acrylate), a polyurethane (meth)acrylate (e.g., a polyester-based urethane (meth)acrylate, and a polyether-based urethane (meth)acrylate), a silicone (meth)acrylate, and others.

The preferred curable resin precursor includes a photo-curable compound curable in a short time, for example, an ultraviolet curable compound (e.g., a monomer, an oligomer, and a resin which may be a low molecular weight resin), and an EB curable compound. In particular, a practically advantageous resin precursor is an ultraviolet curable monomer, or an ultraviolet curable resin. Further, to improve resistance such as abrasion resistance, a photo-curable resin is preferably a compound having polymerizable unsaturated bonds of not less than 2 (preferably about 2 to 6, and more preferably about 2 to 4) in the molecule.

The molecular weight of the curable resin precursor is, allowing for compatibility to the polymer, not more than about 5000, preferably not more than about 2000, and more preferably not more than about 1000.

The curable resin precursor may be used in combination with a curing agent depending on the variety. For example, a thermosetting resin precursor may be used in combination with a curing agent such as an amine or a polyfunctional carboxylic acid, or a photo-curable resin precursor may be used in combination with a photopolymerization initiator.

As the photopolymerization initiator, there may be exemplified a conventional component, e.g., an acetophenone, a propiophenone, a benzyl, a benzoin, a benzophenone, a thioxanthone, an acylphosphine oxide, and others.

The content of the curing agent (such as a photo curing agent) relative to 100 parts by weight of the curable resin precursor is about 0.1 to 20 parts by weight, preferably about 0.5 to 10 parts by weight, and more preferably about 1 to 8 parts by weight (particularly about 1 to 5 parts by weight), and may be about 3 to 8 parts by weight.

Further, the curable resin precursor may contain a curing accelerator or a crosslinking agent. For example, the photo-curable resin precursor may be used in combination with a photo-curing accelerator, e.g., a tertiary amine (e.g., a dialkylaminobenzoic ester) or a phosphine-series photopolymerization accelerator.

In the present invention, among at least one polymer and at least one curable resin precursor, at least two components are preferably used in such a combination as they are phase-separated with each other in the neighborhood of a processing temperature. As such a combination, for example, there may be mentioned (a) a combination in which a plurality of polymers are incompatible with each other and form a phase separation, (b) a combination in which a polymer and a curable resin precursor are incompatible with each other and form a phase separation, (c) a combination in which a plurality of curable resin precursors are incompatible with each other and form a phase separation, and other combinations. Among these combinations, (a) the combination of a plurality of polymers or (b) the combination of a polymer with a curable resin precursor is usually employed, and (a) the combination of a plurality of polymers is particularly preferred. In the case where both components to be phase-separated have high compatibility, both components fail to generate effective phase separation during a drying step for evaporating the solvent, and as a result the layer obtained therefrom deteriorates functions as an anti-glare layer.

Incidentally, a thermoplastic resin and a curable resin precursor (or cured resin) are usually incompatible with each other. When a polymer and a curable resin precursor are incompatible with each other and are phase-separated, a plurality of polymers may be used as the polymer. In the case using a plurality of polymers, only at least one polymer needs to be incompatible with the resin precursor (or cured resin), and other polymer(s) may be compatible with the resin precursor.

Moreover, the above-mentioned combination may be a combination of two thermoplastic resins incompatible with each other and a curable compound (in particular a monomer or oligomer having a plurality of curable functional groups). Further, from the viewpoint of abrasion resistance after curing, one polymer of the above-mentioned incompatible thermoplastic resins (particularly both polymers) may be a thermoplastic resin having a functional group participating in a curing reaction (a functional group participating in curing of the curable resin precursor).

In the case where the polymer comprises a plurality of polymers incompatible with each other to form phase separation, it is preferred that the curable resin precursor is compatible with at least one polymer in the neighborhood of a processing temperature, among a plurality of polymers incompatible with each other. That is, when a plurality of polymers incompatible with each other comprise, for example, a first resin and a second resin, the curable resin precursor needs only to be compatible with at least one of the first resin and the second resin, or may be compatible with both polymer components. In the case where the curable resin precursor is compatible with both polymer components, at least two phases which are phase-separated may be obtained, one phase comprises a mixture containing the first resin and the curable resin precursor as main components, and the other phase comprises a mixture containing the second resin and the curable resin precursor as main components.

In the case where a plurality of polymers to be selected have high compatibility, the polymers fail to generate effective phase separation among themselves during a drying step for evaporating the solvent, and as a result the layer obtained therefrom deteriorates functions as an anti-glare layer.

The curable monomer and a plurality of polymers incompatible with each other are used in such a combination that at least one polymer and the curable monomer are compatible with each other in the neighborhood of a processing temperature. That is, when a plurality of polymers incompatible with each other comprise, for example, a polymer A and a polymer B, the curable monomer needs only to be compatible with at least one of the polymer A and the polymer B, or may be preferably compatible with both polymer components. In the case where the curable monomer is compatible with both polymer components, at least two phases which are phase-separated are obtained, one phase comprises a mixture containing the polymer A and the curable monomer as main components, and the other phase comprises a mixture containing the polymer B and the curable monomer as main components.

Incidentally, each of the phase separability among a plurality of polymers, and the phase separability among the polymer and the curable monomer can be judged conveniently by visually conforming whether the residual solid content becomes clouded or not during a step of preparing a uniform solution with a good solvent to both components and gradually evaporating the solvent.

Further, the polymer and a cured or crosslinked resin obtained by curing the resin precursor are usually different from each other in refraction index. Moreover, the plurality of polymers (the first resin and the second resin) is also different from each other in refraction index. The difference in the refraction index between the polymer and the cured or crosslinked resin, or the difference in the refraction index between the plurality of polymers (the first resin and the second resin) may for example be about 0.001 to 0.2, and preferably about 0.05 to 0.15.

In the spinodal decomposition, with the progress of the phase separation, the bicontinuous structure is formed. On further proceeding the phase separation, the continuous phase becomes discontinuous owing to its own surface tension to change into the droplet phase structure (e.g., an islands-in-the-sea structure containing independent phases such as ball-like shape, spherical shape, discotic shape or oval-sphere shape). Therefore, an intermediate structure of the bicontinuous phase structure and the drop phase structure (i.e., a phase structure in a transitional state from the bicontinuous phase to the drop phase) can also be formed by varying the degree of phase separation. The phase separation structure in the anti-glare layer of the present invention may be an islands-in-the-sea structure (a droplet phase structure, or a phase structure in which one phase is independent or isolated) or a bicontinuous phase structure (or a mesh structure), or may be an intermediate structure being a coexistent state of a bicontinuous phase structure and a droplet phase structure. The phase separation structure realizes the formation of a finely uneven structure on the surface of thus obtained anti-glare layer after drying of the solvent.

In the phase separation structure, it is advantageous from the viewpoint of forming the uneven surface structure and of enhancing the surface hardness that the structure forms a droplet phase structure having at least an island domain. Incidentally, when the phase separation structure comprising a polymer and the above-mentioned precursor (or cured resin) forms an islands-in-the-sea structure, the polymer component may form a sea phase. It is however advantageous from the viewpoint of surface hardness that the polymer component forms island domains. The formation of the island domains realizes a finely uneven structure on the surface of thus obtained anti-glare layer after drying.

Further, the average distance between domains of the above-mentioned phase separation structure usually has a substantial regularity or periodicity. For example, the average distance between phases of domains may be about 1 to 70 μm (e.g., about 1 to 40 μm), preferably about 2 to 50 μm (e.g., about 3 to 30 μm), and more preferably about 5 to 20 μm (e.g., about 10 to 20 μm).

The ratio (weight ratio) of the polymer relative to the curable resin precursor is not particularly limited to a specific one, and for example, the polymer/the curable resin precursor may be selected within the range of about 5/95 to 95/5. From the viewpoint of surface hardness, the ratio (weight ratio) is preferably about 5/95 to 60/40, more preferably about 10/90 to 50/50, and particularly about 10/90 to 40/60.

In the anti-glare film, the thickness of the anti-glare layer may for example be about 0.3 to 20 μm, preferably about 1 to 15 μm (e.g., about 1 to 10 μm), and usually about 2 to 10 μm (particularly about 3 to 7 μm). Incidentally, in the case using the anti-glare layer without laminating on a support, the thickness of the anti-glare layer may for example be selected within a range from about 1 to 100 μm, and preferably about 3 to 50 μm.

(Low Refraction Index Layer)

The low refraction index layer comprises a resin having a low refraction index (or a low refraction index resin). By laminating the low refraction index layer on at least one side of the anti-glare layer, when the low refraction index layer is disposed so that the layer becomes the top layer in an optical member or others, it can be effectively inhibited that an external light (e.g., an exterior light source) is reflected in the surface of the anti-glare film.

The refraction index of the low refraction index resin may for example be about 1.35 to 1.49, preferably about 1.36 to 1.49, and more preferably about 1.38 to 1.48.

Examples of the low refraction index resin include a methylpentene resin, a diethylene glycol bis(allylcarbonate) resin, and a fluorine-containing resin such as a polyvinylidene fluoride (PVDF) and a polyvinylfluoride (PVF). Moreover, usually the low refraction index layer preferably contains a fluorine-containing compound. In the case using the fluorine-containing compound, the refraction index of the low refraction index layer can be optionally reduced.

The fluorine-containing compound includes a fluorine-containing resin precursor which has a fluorine atom, and a reactive functional group (e.g., a curable group such as a crosslinkable group or a polymerizable group) by heat or an actinic ray (e.g., an ultraviolet ray or an electron beam) or the like, and can be cured or crosslinked by heat or an actinic ray or the like to form a fluorine-containing resin (particularly a cured or crosslinked resin). Incidentally, the fluorine-containing compound also includes a cured (e.g., photo-cured or heat cured) fluorine-containing resin precursor (or the cured resin).

Examples of such a fluorine-containing resin precursor include a fluorine atom-containing thermosetting compound or resin [a low molecular weight compound which has a fluorine atom, and a reactive group (e.g., an epoxy group, an isocyanate group, a carboxyl group, a hydroxyl group), a polymerizable group (e.g., a vinyl group, an allyl group, a (meth)acryloyl group) or others], a fluorine atom-containing photo-curable compound or resin which is curable by an actinic ray such as an ultraviolet ray (for example, an ultraviolet ray-curable compound such as a photo-curable fluorine-containing monomer or oligomer), and others.

As the thermosetting compound or resin, there may be mentioned, for example, a low molecular weight resin obtained by using at least a fluorine-containing monomer, e.g., an epoxy-series fluorine-containing resin obtained by using a fluorine-containing polyol (particularly a diol) instead of part or all of polyol components as a constituting monomer; in the same way, an unsaturated polyester-series fluorine-containing resin obtained by using a fluorine atom-containing polyol component and/or fluorine atom-containing polycarboxylic acid component instead of part or all of polyol and/or polycarboxylic acid component(s); a urethane-series fluorine-containing resin obtained by using a fluorine atom-containing polyol and/or polyisocyanate component instead of part or all of polyol and/or polyisocyanate component(s); and others. These thermosetting compounds or resins may be used singly or in combination.

The photo-curable compound includes, for example, a monomer, an oligomer (or a resin, in particular a low molecular weight resin). Examples of the monomer include a fluorine atom-containing monomer corresponding to the monofunctional monomer and polyfunctional monomer exemplified in the paragraph of the anti-glare layer mentioned above [e.g., a monofunctional monomer such as a fluorine atom-containing (meth)acrylic monomer (such as a fluorinated alkyl ester of (meth)acrylic acid), and a vinyl-series monomer (such as a fluoroolefin); and a di(meth) acrylate of a fluorinated alkylene glycol such as 1-fluoro-1, 2-di(meth)acryloyloxyethylene)]. Moreover, as the oligomer or resin, a fluorine atom-containing oligomer or resin corresponding to the oligomer or resin exemplified in the paragraph of the anti-glare layer may be used. These photo-curable compounds may be used singly or in combination.

The curable precursor for the fluorine-containing resin is, for example, procurable in the form of a liquid solution (coating liquid). For example, such a coating liquid may be available as "TT1006A" and "JN7215" manufactured by Japan Synthetic Rubber Co., Ltd., "DEFENSA TR-330" manufactured by Dainippon Ink And Chemicals, Inc., or others.

The thickness of the low refraction index layer may for example be about 0.05 to 2 μm, preferably about 0.1 to 1 μm (e.g., about 0.1 to 0.5 μm), and more preferably about 0.1 to 0.3 μm.

As described above, the anti-glare film may comprise an anti-glare layer and a low refraction index layer, or may comprise a support, and an anti-glare layer and a low refraction index layer formed on the support in this order. As the support, there may be used a support having light transmittance properties, for example, a transparent support such as a synthetic resin film. Moreover, the support having light transmittance properties may comprise a transparent polymer film for forming an optical member.

(Transparent Support)

As the transparent support (or substrate sheet), there may be exemplified a resin sheet in addition to glass and ceramics. As a resin constituting the transparent support, the resin similar to that of the anti-glare layer may be used. The preferred transparent support includes a transparent polymer film, for example, a film formed with a cellulose derivative [e.g., a cellulose acetate such as a cellulose triacetate (TAC) and a cellulose diacetate], a polyester-series resin [e.g., a polyethylene terephthalate (PET), a polybutylene terephthalate (PBT), a polyarylate-series resin], a polysulfone-series resin [e.g., a polysulfone, a polyether sulfone (PES)], a polyether ketone-series resin [e.g., a polyether ketone (PEK), a polyether ether ketone (PEEK)], a polycarbonate-series resin (PC), a polyolefinic resin (e.g., a polyethylene, a polypropylene), a cyclic polyolefinic resin (e.g., ARTON, ZEONEX), a halogen-containing resin (e.g., a polyvinylidene chloride), a (meth)acrylic resin, a styrenic resin (e.g., a polystyrene), a vinyl acetate- or vinyl alcohol-series resin (e.g., a polyvinyl alcohol) and others. The transparent support may be stretched monoaxially or biaxially, and the transparent support having optical isotropy is preferred. The preferred transparent support is a support sheet or film having a low birefringence index. The optically isotropic transparent support comprises a non-stretched sheet or film, and includes a sheet or film composed of, for example, a polyester (e.g., a PET, a PBT), a cellulose ester, in particular a cellulose acetate (e.g., a cellulose acetate such as a cellulose diacetate and a cellulose triacetate, a $C_{3-4}$ organic acid ester of cellulose acetate such as a cellulose acetate propionate and a cellulose acetate butyrate) or the like. The thickness of the support having a two-dimensional structure may be selected within the range of, for example, about 5 to 2000 μm, preferably about 15 to 1000 μm, and more preferably about 20 to 500 μm.

(Optical Member)

The anti-glare layer has not only high anti-glareness but also high light-scattering properties. In particular, the anti-glare film can enhance scattered intensities in a range of a specific angle with isotropically transmitting and scattering the transmitted light. Moreover, the anti-glare film also has high visibility of a transmitted image. Further, in the surface of the low refraction index layer, reflection of an external light can be efficiently inhibited. Therefore, the anti-glare film of the present invention is suitable for application of an optical member or others, and the above-mentioned support may also comprise a transparent polymer film for forming various optical members. The anti-glare film obtained in combination with the transparent polymer film may be directly used as an optical member, or may form an optical member in combination with an optical element [for example, a variety of optical elements to be disposed into a light path, e.g., a polarizing plate, an optical retardation plate (or phase plate), and a light guide plate (or light guide)]. That is, the anti-glare film may be disposed or laminated on at least one light path surface of an optical element. For example, the anti-glare film may be laminated on at least one surface of the optical retardation plate, or may be disposed or laminated on an emerging surface (or emerge surface) of the light guide plate.

The anti-glare film in which abrasion resistance is imparted to an anti-glare layer thereof can be also performed as a protective film. The anti-glare film of the present invention is, therefore, suitable for utilizing as a laminate (optical member) in which an anti-glare film is used instead of at least one protective film among two protective films constituting a polarizing plate, that is, as a laminate (optical member) in which an anti-glare film is laminated on at least one surface of a polarizing plate.

In the anti-glare film of the present invention, finely uneven structure corresponding to the above-mentioned phase separation structure is formed in large quantity on the surface of the anti-glare layer. Thus, the anti-glare film is capable of preventing dazzle with preventing reflection of a surrounding scenery caused by surface reflection, and can enhance anti-glareness. Further, since a low refraction index layer is overcoated on such an anti-glare layer, the finely uneven structure (e.g., an uneven structure having a vertical interval of about not more than 1 μm) is covered, and as a result, whitening of the display can be decreased with lowing of reflectance due to decrease of the refraction index in the surface. Incidentally, whitening of the display may for example be visually evaluated by bonding an anti-glare film to a black plate through a transparent adhesive.

Further as described above, in the phase separation structure, the average distance between phases of domains substantially has regularity or periodicity. The light being incident on the anti-glare film and transmitted through the anti-glare film, therefore, shows maximum (local maximum) of the scattered light at a specific angle away from the rectilinear transmitted light by Bragg reflection corresponding to the average distance between phases (or regularity of the uneven surface structure). That is, the anti-glare film of the present invention isotropically transmits and scatters or diffuses an incident light, while the scattered light (transmitted scattered-light) shows maximum value of the light intensity at a scattering angle which is shifted from the scattering center [for example, at about 0.1 to 10°, preferably about 1 to 10° (e.g., about 3 to 9°), more preferably about 1 to 8° (e.g., about 4 to 8°), particularly about 1.5 to 8° (e.g., about 1.5 to 5°), and usually about 2 to 5°]. The use of the anti-glare film accordingly avoids the problem of dazzle which was insoluble with the use of a conventional fine particle-dispersed anti-glare sheet, because adverse affects of the scattered light through the uneven surface structure are extremely small relative to the profile of rectilinear transmitted light.

Concerning an angle distribution profile of a scattered light intensity, the maximal value of the above-mentioned scattered light intensity may form peak-shapes separated each other. Even when the angle distribution profile has a shoulder-shaped peak or a flat-shaped peak, it is regarded that the scattered light intensity has the maximum value.

Figure 1:
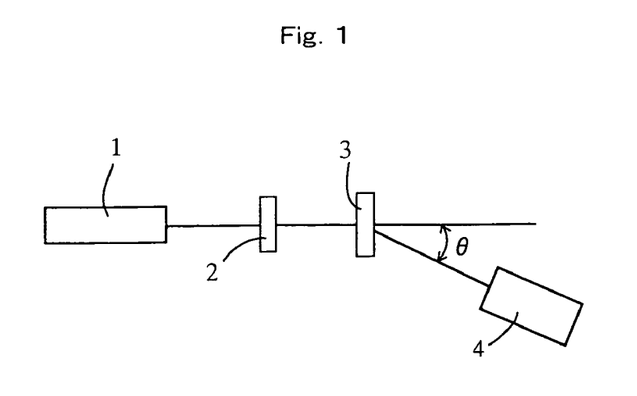
FIG. 1 is a schematic illustration showing an apparatus for measuring an angle distribution of a transmitted light.

Incidentally, the angle distribution of the light transmitted through the anti-glare film can be measured by means of a measuring equipment comprising a laser beam source 1 such as He-Ne laser, and a beam receiver 4 set on a goniometer, as shown in FIG. 1. In the embodiment, the relationship between the scattered light intensity and the scattering angle θ is determined by irradiating a sample 3 with a laser beam from the laser beam source 1 through an ND filter 2, and detecting the scattered light from the sample by means of a detector (beam receiver) 4 which is capable of varying an angle at a scattering angle θ relative to a light path of the laser beam and comprises a photomultiplier. As such an equipment, an automatic measuring equipment for laser beam scatteration (manufactured by NEOARK Corporation) is utilizable.

The total light transmittance of the anti-glare film of the present invention is, for example, about 70 to 100%, preferably about 80 to 100%, more preferably about 85 to 100% (e.g., about 85 to 95%), and particularly about 90 to 100% (e.g., about 92 to 99%).

The haze of the anti-glare film of the present invention is about 10 to 60%, preferably about 20 to 50%, more preferably about 25 to 50% (e.g., about 30 to 50%), and particularly about 25 to 45% (e.g., about 35 to 45%).

The anti-glareness can be evaluated by visual observation of a fluorescent tube reflection, and with a gloss meter according to JIS K7105. Further, dazzle and blur of images can be visually evaluated by means of a high definition liquid crystal display apparatus having resolution of about 200 ppi. More simply, the anti-glareness may be visually evaluated by means of a high definition CRT display apparatus, or a simple evaluation apparatus comprising a color filter for liquid crystal having resolution of about 150 ppi in combination with a backlight.

The haze and the total light transmittance can be measured with a NDH-300A haze meter manufactured by Nippon Denshoku Industries Co., Ltd. in accordance with JIS K7105.

The visibility of a transmitted image of the anti-glare film of the present invention is, in the case using an optical slit of 0.5 mm width, about 70 to 100%, and preferably about 80 to 100%. When the visibility of a transmitted image is within the above range, the anti-glare film realizes prevention of vagueness or unclearness of the pixel border, even in a high definition display apparatus, due to low defocusing of the transmitted light, and as a result, realizes prevention of blur of images.

The visibility of a transmitted image is a measure for quantifying defocusing or distortion of a light transmitted through a film. The visibility of a transmitted image is obtained by measuring a transmitted light from a film through a movable optical slit, and calculating amount of light in both a light part and a dark part of the optical slit. That is, in the case where a transmitted light is defocused by a film, the slit image formed on the optical slit becomes thicker, and as a result the amount of light in the transmitting part is not more than 100%. On the other hand, in the non-transmitting part, the amount of light is not less than 0% due to leakage of light. The value C of the visibility of a transmitted image is defined by the following formula according to the maximum value M of the transmitted light in the transmitting part of the optical slit, and the minimum value m of the transmitted light in the non-transmitting part thereof.

$$C(\%) = [(M-m)/(M+m)] \times 100$$

That is, the closer the value C comes to 100%, the lower the image defocusing depending on the anti-glare film is. [reference; Suga and Mitamura, Tosou Gijutsu, July, 1985].

As an apparatus for measuring the visibility of a transmitted image, there may be used an image clarity measuring apparatus ICM-1DP (manufactured by Suga Test Instruments Co., Ltd.). As the optical slit, there may be used an optical slit of 0.125 mm to 2 mm width.

Incidentally, in the present invention, it is particularly preferred that both of the visibility of a transmitted image and the haze are within the range mentioned above.

The solvent to be used in wet spinodal decomposition may be selected depending on the species and solubility of the polymer and the curable resin precursor, and needs only to be a solvent for uniformly dissolving at least solid content (a plurality of polymers and curable resin precursor(s), a reaction initiator, other additive(s)). As such a solvent, there may be mentioned, for example, a ketone (e.g., acetone, methyl ethyl ketone, methyl isobutyl ketone, cyclohexanone), an ether (e.g., dioxane, tetrahydrofuran), an aliphatic hydrocarbon (e.g., hexane), an alicyclic hydrocarbon (e.g., cyclohexane), an aromatic hydrocarbon (e.g., toluene, xylene), a carbon halide (e.g., dichloromethane, dichloroethane), an ester (e.g., methyl acetate, ethyl acetate, butyl acetate), water, an alcohol (e.g., ethanol, isopropanol, butanol, cyclohexanol), a cellosolve (e.g., methyl cellosolve, ethyl cellosolve), a cellosolve acetate, a sulfoxide (e.g., dimethyl sulfoxide), and an amide (e.g., dimethylformamide, dimethyhlacetamide). Moreover, the solvent may be a mixed solvent.

The anti-glare film of the present invention can be obtained, with the use of a liquid phase (or a liquid-like composition) containing the polymer, the curable resin precursor and the solvent, by forming a phase separation structure by spinodal decomposition from the liquid phase (or the liquid-like composition) concurrent with evaporation of the solvent; curing the curable resin precursor to form an anti-glare layer; and forming a low refraction index layer on the anti-glare layer.

The phase separation structure may be usually formed by coating or casting (flow casting) a liquid mixture containing the polymer, the curable resin precursor and the solvent (particularly a liquid composition such as a uniform solution) on an separable or non-separable support; and evaporating the solvent from the coating layer. Thus obtained phase separation structure has a regular or periodical average distance between phases.

The anti-glare layer may be obtained by forming the phase separation structure, and thereafter curing at least the above-mentioned curable resin precursor with a thermal source or an actinic ray. In the preferred embodiment, as the liquid mixture, there may be used a composition containing the thermoplastic resin, the photo-curable compound, the photopolymerization initiator, and the solvent for dissolving the thermoplastic resin and the photo-curable compound. The photo-curable component in a phase separation structure formed by spinodal decomposition is cured with a light irradiation to obtain an anti-glare layer. In another preferred embodiment, as the liquid mixture, there may be used a composition containing the plurality of polymers incompatible with each other, the photo-curable compound, the photopolymerization initiator, and the solvent. The photo-curable component in a phase separation structure formed by spinodal decomposition is cured with a light irradiation to obtain an anti-glare layer.

The concentration of the solute (the polymer, the curable resin precursor, the reaction initiator, and other additive(s)) in the liquid mixture can be selected within the range causing the phase separation and not deteriorating castability and coatability, and is, for example, about 1 to 80% by weight, preferably about 5 to 60% by weight, and more preferably about 15 to 40% by weight (particularly about 20 to 40% by weight).

Incidentally, when the liquid mixture is coated on a transparent support, the transparent support sometimes dissolves or swells according to the species of solvents. For example, when a coating liquid (uniform solution) containing a plurality of resins is coated on a cellulose triacetate film, the coating surface of the cellulose triacetate film sometimes elutes, corrodes, or swells depending on the species of solvents. In this case, the coating surface of the transparent support (e.g., cellulose triacetate film) may be applied with a solvent-resisting coating agent in advance to form an optically isotropic coating layer with solvent resistance. Such a coating layer can be formed with, for example, a thermoplastic resin such as an AS resin, a polyester-series resin, and a polyvinyl alcohol-series resin (e.g., a polyvinyl alcohol, an ethylene-vinyl alcohol copolymer), a curable resin (setting resin) such as an epoxy resin, a silicone-series resin, and an ultraviolet curable resin.

Moreover, when a liquid mixture or coating liquid is coated on a transparent support, a solvent in which the transparent support does not dissolve, corrode or swell may be selected according to the species of the transparent support. For example, when a cellulose triacetate film is employed as the transparent support, tetrahydrofuran, methyl ethyl ketone, isopropanol, toluene or the like is used as a solvent for the liquid mixture or the coating liquid and thus the anti-glare layer can be formed without deteriorating properties of the film.

After the liquid mixture is cast or coated, phase separation by spinodal decomposition can be induced by evaporating or removing the solvent. The temperature (phase separation temperature) in the evaporation or removal of the solvent is not particularly limited to a specific one, and for example, the difference between the boiling point of the solvent and the evaporation temperature is preferably selected within 120° C., preferably within 100° C. (e.g., within 70° C.), and more preferably within 60° C. (e.g., within 50° C.). Moreover, the solvent may be evaporated at a temperature lower than the boiling point of the solvent [e.g., at a temperature about 1° C. to 120° C. (preferably about 5° C. to 50° C., and particularly about 10° C. to 50° C.) lower than the boiling point of the solvent]. The evaporation or removal of the solvent may be usually carried out by drying, for example drying at an temperature of about 30° C. to 200° C. (e.g., about 30° C. to 100° C.), preferably about 40° C. to 120° C., and more preferably about 40° C. to 80° C. according to the boiling point of the solvent.

Such spinodal decomposition accompanied by evaporation of the solvent imparts regularity and periodicity to the average distance between domains of the phase separation structure. Then, the phase separation structure formed by spinodal decomposition can be immediately fixed by curing the precursor. The curing of the curable resin precursor can be carried out with applying heat, light irradiation, or a combination of these methods depending on the species of the precursor. The heating temperature may be selected within the appropriate range as far as having the phase separation structure, for example, within about 50° C. to 150° C., or may be selected within the temperature range similar to that in the above-mentioned phase separation process.

Light irradiation can be selected depending on the species of the photo-curable component or the like, and ultraviolet ray, electron beam or the like is usually available for light irradiation. The general-purpose light source for exposure is usually an ultraviolet irradiation equipment. If necessary, light irradiation may be carried out under an inert gas atmosphere.

The process for forming the low refraction index layer is not particularly limited to a specific one, and it is sufficient that a layer comprising at least the above-mentioned resin-based material is formed on the anti-glare layer. The low refraction index layer may be usually formed by coating or flow casting a coating liquid containing a low refraction index component on the anti-glare layer, and curing the coating film with a thermal source or an actinic ray.

The coating liquid may usually comprise, in addition a low refraction index component (e.g., a fluorine-containing compound), an organic solvent [e.g., an organic solvent similar to a solvent exemplified in the paragraph of the anti-glare layer, depending on the species of the low refraction index resin], and further a reactive diluent [e.g., (meth) acrylic monomer such as a polyfunctional (meth)acrylate]. Such a solvent may be evaporated and removed together with formation of the coating film. In the case where the solvent is a reactive diluent, the solvent may be cured by polymerization along with curing of a fluorine-containing resin precursor. The coating liquid may further comprise a curing agent [for example, a thermal polymerization initiator such as an organic peroxide; a photopolymerization initiator (e.g., a ketone-series polymerization initiator such as 1-hydroxy-cyclohexyl-phenyl-ketone)]. Moreover, the coating liquid may comprise a crosslinking agent, or others.

The concentration of the solid content (a low refraction index component, a curable compound, other additive(s)) in the coating liquid for a low refraction index layer may be selected within such a range that coating properties or others are not deteriorated, and for example, the concentration is about 0.1 to 50 wt. %, preferably 0.5 to 10 wt. %, and more preferably 1 to 5 wt. %.

[Display Apparatus]

The anti-glare film of the present invention has hardcoat (or hardcoating) properties and high anti-glareness. Moreover, the anti-glare film realizes enhancement of scattered light intensities in a specific range of the angle with isotropically transmitting and scattering the transmitted light. Further, the anti-glare film is excellent in the visibility of a transmitted image, and low in blur of images on a display surface. The anti-glare film or optical member of the present invention, therefore, can be utilized for various display apparatuses or devices such as a liquid crystal display (LCD) apparatus, a plasma display, and a touch panel-equipped display device. These display apparatuses comprise the anti-glare film or the optical member (particularly, e.g., a laminate of a polarizing plate and an anti-glare film) as an optical element.

Incidentally, the liquid crystal display apparatus may be a reflection-mode (or reflective) liquid crystal display apparatus using an external light (or outside light) for illuminating a display unit comprising a liquid crystal cell, or may be a transmission-mode (or transmissive) liquid crystal display apparatus comprising a backlight unit for illuminating a display unit. In the reflection-mode liquid crystal display apparatus, the display unit can be illuminated by taking in an incident light from the outside through the display unit, and reflecting the transmitted incident light by a reflective member. In the reflection-mode liquid crystal display apparatus, the anti-glare film or optical member (particularly a laminate of a polarizing plate and an anti-glare film) can be disposed in a light path in front of the reflective member. For example, the anti-glare film or optical member can be disposed or laminated, for example, between the reflective member and the display unit, or in front of the display unit.

In the transmission-mode liquid crystal display apparatus, the backlight unit may comprise a light guide plate (e.g., a light guide plate having a wedge-shaped cross section) for allowing a light from a light source (e.g., a tubular light source such as a cold cathode tube, a point light source such as a light emitting diode) incident from one side of the light guide plate and for allowing the incident light to emit from the front emerging surface. Moreover, if necessary, a prism sheet may be disposed in front of the light guide plate. Incidentally, a reflective member for allowing a light obtained from the light source to reflect to the emerging surface side is usually disposed on the reverse side of the light guide plate. In such a transmission-mode liquid crystal display apparatus, the anti-glare film or the optical member may be usually disposed or laminated into a light path in front of the light source. For example, the anti-glare film or optical member can be disposed or laminated between the light guide plate and the display unit, in front of the display unit, or others.

The present invention is useful for a variety of application in need of anti-glareness and light-scattering properties, e.g., for the optical member or an optical element of a display apparatus such as a liquid crystal display apparatus (in particular, a high definition or high definitional color display apparatus).

Figure 3:
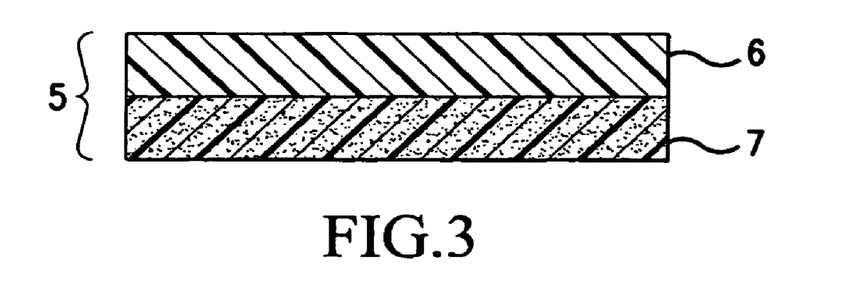
FIG. 3 is a cross-sectional view of one embodiment of the anti-glare film of the present invention.
Figure 4:
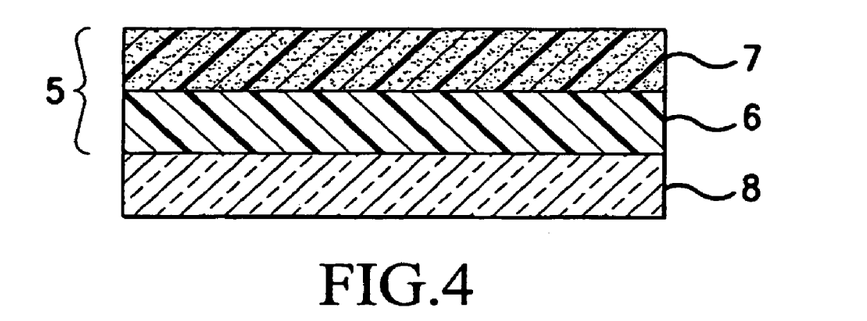
FIG. 4 is cross-sectional view of another embodiment of the anti-glare film of the present invention.
Figure 5:
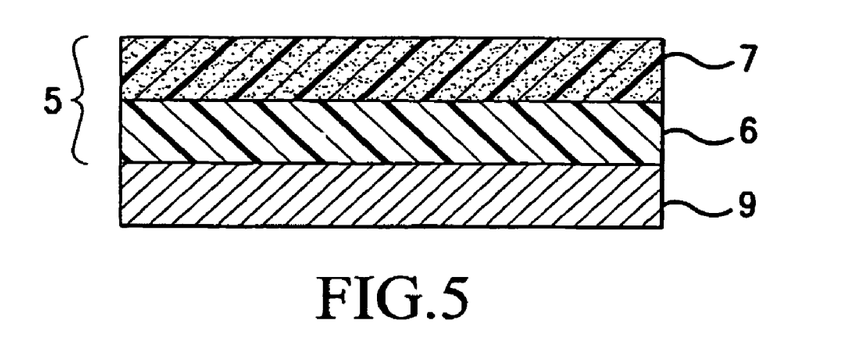
FIG. 5 is a cross-sectional view of yet another embodiment of the anti-glare film of the present invention.

According to the present invention, as shown in FIGS. 3–5, an anti-glare film 5 comprises an anti-glare layer 6 having a phase separation structure utilizing spinodal decomposition, and a resin layer 7 having a low refraction index. Thus, the anti-glare film improves anti-glareness, and prevents reflection of a surrounding scenery and dazzle (or glare) on a display surface even in a high definition display apparatus. Also, the anti-glare film inhibits or suppresses reflection of an exterior light on the display surface. Moreover, the present invention provides an anti-glare film being capable of preventing blur of images in a display surface even in a high definition display apparatus, and having less-whitish to improve contrast of the image. Further, the anti-glare film can be enhanced in abrasion resistance and can efficiently control the intensity distribution of the transmitted scattered-light.

Further, the anti-glare film 5 of the present invention may comprise an anti-glare layer 6 and a resin layer 7 formed on a transparent support 8 in that order (FIG. 4). The anti-glare film 5 may also be laminated on at least one side of a polarizing plate 9.

EXAMPLES

The following examples are intended to describe this invention in further detail and should by no means be interpreted as defining the scope of the invention.

Example 1

In 37.4 parts by weight of a mixed solvent containing MEK and 1-butanol at the proportion of 8/2 [the former/the latter] were dissolved 5.1 parts by weight of an acrylic resin having a polymerizable unsaturated group(s) in a side chain thereof [a compound in which 3,4-epoxycyclohexenylmethyl acrylate is added to part of carboxyl groups in a (meth)acrylic acid-(meth)acrylic acid ester copolymer; manufactured by Daicel Chemical Industries, Ltd., CYCLOMER-P (ACA) 320M, solid content: 48.6% by weight], 1.2 parts by weight of a cellulose acetate propionate (acetylation degree=2.5%, propionylation degree=46%, number average molecular weight in terms of polystyrene: 75000; manufactured by Eastman, Ltd., CAP-482-20), 6.3 parts by weight of a polyfunctional acrylic UV curable monomer (manufactured by Daicel UCB Co., Ltd., DPHA), and 0.6 part by weight of a photo initiator (manufactured by Ciba Specialty Chemicals K.K., IRGACURE 184). This solution was cast on a cellulose triacetate film with the use of a wire bar #24, then the film was allowed to stand in an explosion-proof oven for 3 minutes, and the solvent was evaporated to form a coat layer about 7 µm thick. Following that, the coat layer was subjected to UV curing treatment for about 30 seconds by irradiating ultraviolet ray derived from a metal halide lump (manufactured by Eyegraphics Co., Ltd.) to form an anti-glare hardcoat layer having an uneven surface structure. As an overcoat layer, a two-component thermosetting coating liquid containing a fluorine-containing compound ("TT1006" manufactured by JSR Corporation) was coated with the use of a wire bar #10, and dried, then hot cured (or heat cured) at 120° C. for 10 minutes.

Example 2

In 37.2 parts by weight of a mixed solvent containing MEK and 1-butanol at the proportion of 8.5/1.5 [the former/the latter] were dissolved 5.4 parts by weight of an acrylic resin having a polymerizable unsaturated group(s) in a side chain thereof [a compound in which 3,4-epoxycyclohexenylmethyl acrylate is added to part of carboxyl groups in a (meth)acrylic acid-(meth)acrylic ester copolymer; manufactured by Daicel Chemical Industries, Ltd., CYCLOMER-P (ACA) 320M, solid content: 48.6% by weight], 1.1 parts by weight of a cellulose acetate propionate (acetylation degree=2.5%, propionylation degree=46%, number average molecular weight in terms of polystyrene: 75000; manufactured by Eastman, Ltd., CAP-482-20), 6.3 parts by weight of a polyfunctional acrylic UV curable monomer (manufactured by Daicel UCB Co., Ltd., DPHA), and 0.6 part by weight of a photo initiator (manufactured by Ciba Specialty Chemicals K.K., IRGACURE 184). This solution was cast on a cellulose triacetate film with a wire bar #30, then the film was allowed to stand in an explosion-proof oven for 3 minutes, and the solvent was evaporated to form a coat layer of about 8 µm thick. Following that, the coat layer was subjected to UV curing treatment for about 30 seconds by irradiating ultraviolet ray derived from a metal halide lump (manufactured by Eyegraphics Co., Ltd.) to form an anti-glare hardcoat layer having an uneven surface structure. A two-component thermosetting coating liquid containing a fluorine-containing compound ("TT1006" manufactured by JSR Corporation) was coated as an overcoat layer with a wire bar #5, and dried, then hot cured at 120° C. for 10 minutes.

Example 3

In 37.3 parts by weight of THF were dissolved 5.3 parts by weight of an acrylic resin having a polymerizable unsaturated group(s) in a side chain thereof [a compound in which 3,4-epoxycyclohexenylmethyl acrylate is added to part of carboxyl groups in a (meth)acrylic acid-(meth)acrylic ester copolymer; manufactured by Daicel Chemical Industries, Ltd., CYCLOMER-P (ACA) 320M, solid content: 48.6% by weight], 1.2 parts by weight of a cellulose acetate propionate (acetylation degree=2.5%, propionylation degree=46%, number average molecular weight in terms of polystyrene: 75000; manufactured by Eastman, Ltd., CAP-482-20), 6.2 parts by weight of a polyfunctional acrylic UV curable monomer (manufactured by Daicel UCB Co., Ltd., DPHA), and 0.6 part by weight of a photo initiator (manufactured by Ciba Specialty Chemicals K.K., IRGACURE 184). This solution was cast on a cellulose triacetate film with the use of a wire bar #30, then the film was allowed to stand in an explosion-proof oven for 3 minutes, and the solvent was evaporated to form a coat layer of about 8 µm thick. Following that, the coat layer was subjected to UV curing treatment for about 30 seconds by irradiating ultraviolet ray derived from a metal halide lump (manufactured by Eyegraphics Co., Ltd.) to form an anti-glare hardcoat layer having an uneven surface structure. As an overcoat layer, a thermosetting coating liquid containing a fluorine-containing compound ("JN7215" manufactured by JSR Corporation) was coated with the use of a wire bar #5, and dried, then hot cured at 120° C. for one hour.

Example 4

In 37.4 parts by weight of a mixed solvent containing MEK and 1-methoxy-2-propanol at the proportion of 6/4 [the former/the latter] were dissolved 5.1 parts by weight of an acrylic resin having a polymerizable unsaturated group(s) in a side chain thereof [a compound in which 3,4-epoxycyclohexenylmethyl acrylate is added to part of carboxyl groups in a (meth)acrylic acid-(meth)acrylic ester copolymer; manufactured by Daicel Chemical Industries, Ltd., CYCLOMER-P (ACA) 320M, solid content: 48.6% by weight], 1.1 parts by weight of a cellulose acetate propionate (acetylation degree=2.5%, propionylation degree=46%, number average molecular weight in terms of polystyrene: 75000; manufactured by Eastman, Ltd., CAP-482-20), 6.4 parts by weight of a polyfunctional acrylic UV curable monomer (manufactured by Daicel UCB Co., Ltd., DPHA), and 0.6 part by weight of a photo initiator (manufactured by Ciba Specialty Chemicals K.K., IRGACURE 184). This solution was cast on a cellulose triacetate film with a wire bar #30, then the film was allowed to stand in an explosion-proof oven for 3 minutes, and the solvent was evaporated to form a coat layer of about 8 μm thick. Following that, the coat layer was subjected to UV curing treatment for about 30 seconds by irradiating ultraviolet ray derived from a metal halide lump (manufactured by Eyegraphics Co., Ltd.) to form an anti-glare hardcoat layer having an uneven surface structure. A two-component thermosetting coating liquid containing a fluorine-containing compound ("TT1006" manufactured by JSR Corporation) as an overcoat layer was coated with a wire bar #5, and dried, then hot cured at 120° C. for 10 minutes.

Comparative Example 1

In 37.4 parts by weight of a mixed solvent containing MEK and 1-butanol at the proportion of 8/2 [the former/the latter] were dissolved 5.1 parts by weight of an acrylic resin having a polymerizable unsaturated group(s) in a side chain thereof [a compound in which 3,4-epoxycyclohexenylmethyl acrylate is added to part of carboxyl groups in a (meth)acrylic acid-(meth)acrylic ester copolymer; manufactured by Daicel Chemical Industries, Ltd., CYCLOMER-P (ACA) 320M, solid content: 48.6% by weight], 1.2 parts by weight of a cellulose acetate propionate (acetylation degree=2.5%, propionylation degree=46%, number average molecular weight in terms of polystyrene: 75000; manufactured by Eastman, Ltd., CAP-482-20), 6.3 parts by weight of a polyfunctional acrylic UV curable monomer (manufactured by Daicel UCB Co., Ltd., DPHA), and 0.6 part by weight of a photo initiator (manufactured by Ciba Specialty Chemicals K.K., IRGACURE 184). This solution was cast on a cellulose triacetate film with the use of a wire bar #30, then the film was allowed to stand in an explosion-proof oven for 3 minutes, and the solvent was evaporated to form a coat layer of about 8 μm thick. Following that, the coat layer was subjected to UV curing treatment for about 30 seconds by irradiating ultraviolet ray derived from a metal halide lump (manufactured by Eyegraphics Co., Ltd.) to form an anti-glare film having an uneven surface structure.

Comparative Example 2

Twenty parts by weight of a polyfunctional acrylic UV curable monomer (manufactured by Daicel UCB Co., Ltd., DPHA), 2 parts by weight of an acryl-styrene beads having the average particle size of 3.5 μm as a transparent fine particle, 1 part by weight of a photo initiator (manufactured by Ciba Specialty Chemicals K.K., IRGACURE 184) were mixed in 30 parts by weight of a mixed solvent containing tetrahydrofuran and toluene [tetrahydrofuran/toluene=7/3 (weight ratio)] to prepare a dispersion liquid. The dispersion liquid was coated so that the thickness of the coat layer became 3 m after drying. Following that, the coat layer was subjected to UV curing treatment by irradiating ultraviolet ray derived from a metal halide lump (manufactured by Eyegraphics Co., Ltd.) for about 30 seconds to form an anti-glare hardcoat layer having an uneven surface structure.

Comparative Example 3

As an overcoat layer, a two-component thermosetting coating liquid containing a fluorine-containing compound ("TT1006" manufactured by JSR Corporation) was coated on the anti-glare hardcoat layer obtained in Comparative Example 2 with the use of a wire bar #5, and dried, then hot cured at 120° C. for 10 minutes.

When the anti-glare and antireflection films obtained in Examples 1 to 4 were observed with a transmission optical microscope, the coating layers had a droplet phase separation structure.

Figure 2:
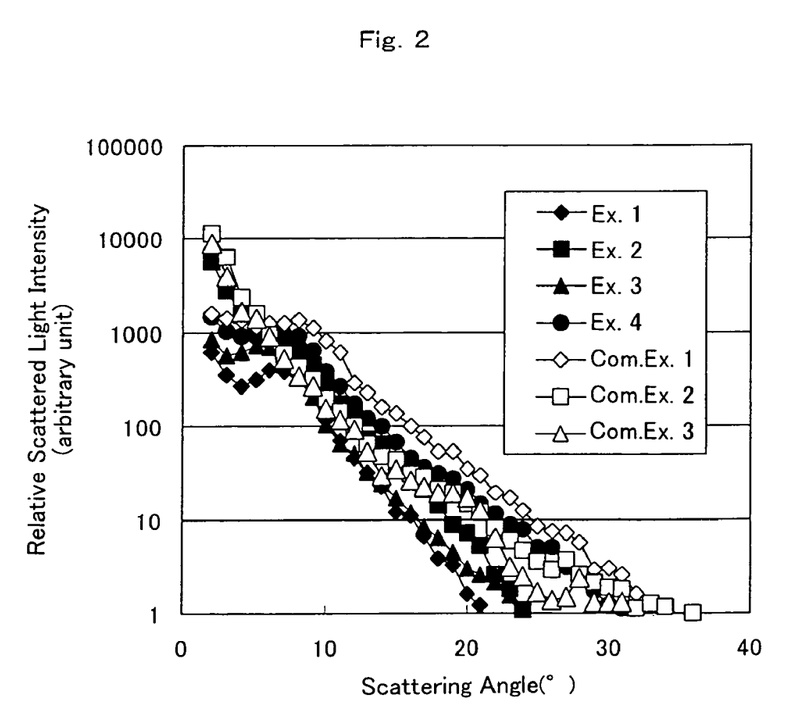
FIG. 2 is a graph showing the relationship between scattered light intensity and scattering angle, which is obtained in Examples and Comparative Examples.

Concerning Examples 1 to 4 and Comparative Examples 1 to 3, when the angle distribution of the transmitted light was measured with the equipment shown in FIG. 1, the maximum of the scattering light was observed at a scattering angle which was separated from the rectilinear transmitted light (scattering angle=0°), as shown in FIG. 2, in the films of Examples 1 to 4 and Comparative Example 1. Moreover, in anti-glare films of Examples 1 to 4 and Comparative Example 3, each having a fluorine-series overcoat layer on the surface thereof, the scattering in a scattering angle wider than about 20° is reduced. It is estimated that this fact is attributed to filling into the finely uneven surface structure of not more than about 1 μm on the surface with the overcoat.

Regarding the anti-glare and antireflection films obtained by Examples 1 to 4 and Comparative Examples 1 to 3, the visibility of a transmitted image, the total light transmittance, the haze, the 60° gloss, the pencil hardness with load of 500 g, dazzle, blur of images, anti-glareness, and whitening of display were evaluated. The results are shown in Table 1 all together. Incidentally, dazzle, blur of images, anti-glareness, and whitening of display were evaluated by the following manners.

(Evaluation of Dazzle)

Dazzle in the display surface was determined by disposing the obtained anti-glare and antireflection film on a color filter for liquid crystal having 150 ppi resolution, irradiating back light from behind, and visually evaluating dazzle in accordance with the following criteria.

"A": dazzle was unrecognized
"B": dazzle was slightly recognized
"C": dazzle was recognized (Evaluation of Blur of Images)

Blur of images in the display surface was determined by disposing the obtained anti-glare and antireflection film on a color filter for liquid crystal having 150 ppi resolution, irradiating back light from behind, and visually evaluating blur of images in accordance with the following criteria.

"A": blur of images was unrecognized
"B": blur of images was slightly recognized
"C": blur of images was recognized (Evaluation of Anti-glareness)

Anti-glareness was determined by projecting a bare fluorescent tube (louver-free fluorescent tube) on the anti-glare antireflection film, and visually evaluating glareness of the regular-reflected light in accordance with the following criteria.

"A": glareness was unrecognized
"B": glareness was slightly recognized
"C": glareness was recognized (Evaluation of Whitening)

A sample was obtained by applying an anti-glare and antireflection film to a black plate with a transparent adhesive, where the black plate was created by dispersing a carbon black in a cellulose-series binder resin and coating the dispersed product on a PET film. Whitening was determined by visually evaluating the sample on the basis of the following criteria.

"A": No whitish tinge is recognized.
"B": Whitish tinge is slightly recognized.
"C": Whitish tinge is recognized.

TABLE 1

|  | Examples | | | | Comparative Examples | | |
| --- | --- | --- | --- | --- | --- | --- | --- |
|  | 1 | 2 | 3 | 4 | 1 | 2 | 3 |
| Visibility of transmitted image (%) | 94.3 | 81.7 | 90.2 | 85.1 | 93.2 | 32.3 | 39.1 |
| Total light transmittance (%) | 94.3 | 93.6 | 93.9 | 94.2 | 93.1 | 92.0 | 93.6 |
| Haze (%) | 16.5 | 32.7 | 30.4 | 50.5 | 44.5 | 39.1 | 36.8 |
| 60° Gloss | 76 | 31 | 48 | 25 | 25 | 46 | 44 |
| Pencil hardness (load: 500 g) | 2H | 2H | 2H | 2H | 2H | 2H | 2H |
| Dazzle | A | A | A | A | A | C | C |
| Blur of images | A | A | A | B | B | B | B |
| Anti-glareness | B | A | B | A | A | B | B |
| Whitening | A | A | A | B | C | C | A |

It is apparent that the anti-glare and antireflection film of the present invention has high anti-glareness, and effectively prevents dazzle, blur of images and whitening on a display surface of a high definition display apparatus.

What is claimed is:

1. An anti-glare film comprising an anti-glare layer, and a resin layer having a low refraction index formed on at least one side of the anti-glare layer,
    wherein the anti-glare layer has an uneven surface structure, and the anti-glare film isotropically transmits and scatters an incident light to show the maximum value of the scattered light intensity at a scattering angle of 0.1 to 10°, and has a total light transmittance of 70 to 100%, and
    wherein the anti-glare layer is formed from at least one polymer and at least one curable resin precursor having a molecular weight of not more than 5000, and is prepared by phase-separating with spinodal decomposition from a liquid phase at least two components selected from the group consisting of polymers and curable resin precursors, and curing at least one of the precursors, and
    said resin layer comprises a fluorine-containing resin having a refraction index of 1.36 to 1.49.

2. An anti-glare film according to claim 1, which has a visibility of a transmitted image of 70 to 100% measured by an image clarity measuring apparatus provided with an optical slit of 0.5 mm width, and has a haze of 10 to 60%.

3. An anti-glare film according to claim 1, which isotropically transmits and scatters an incident light to show the maximum value of the scattered light intensity at a scattering angle of 1 to 10°, and has a total light transmittance of 80 to 100%.

4. An anti-glare film according to claim 1, wherein (i) a plurality of polymers, (ii) a combination of a polymer and a curable resin precursor, or (iii) a plurality of curable resin precursors is phase-separated by spinodal decomposition.

5. An anti-glare film according to claim 1, wherein the polymer comprises a plurality of polymers being phase-separable from each other by spinodal decomposition, and at least one curable resin precursor is compatible with at least one polymer of the plurality of polymers.

6. An anti-glare film according to claim 5, wherein at least one polymer of the plurality of polymers has a functional group participating in a curing reaction of at least one curable resin precursor.

7. An anti-glare film according to claim 6, wherein the plurality of polymers phase-separated by spinodal decomposition comprise a cellulose derivative and at least one resin selected from the group consisting of a styrenic resin, a (meth)acrylic resin, an alicyclic olefinic resin, a polycarbonate-series resin, and a polyester-series resin; and at least one polymer of the polymers has a polymerizable group.

8. An anti-glare film according to claim 5, wherein at least one polymer of the plurality of polymers has a (meth)acryloyl group.

9. An anti-glare film according to claim 1, wherein at least one curable resin precursor comprises at least one member selected from the group consisting of an epoxy (meth)acrylate, a urethane (meth)acrylate, a polyester (meth)acrylate, a silicone (meth)acrylate, and a polyfunctional monomer having at least two polymerizable unsaturated bonds.

10. An anti-glare film according to claim 1, wherein abrasion resistance is imparted to the anti-glare layer by curing at least one curable resin precursor.

11. An anti-glare film according to claim 1, wherein the anti-glare layer has a regular or periodical phase-separation structure fixed by curing at least one curable resin precursor.

12. An anti-glare film according to claim 1, wherein the anti-glare layer is cured with at least one curing means selected from the group consisting of an actinic ray and a thermal source.

13. An anti-glare film according to claim 1, wherein the anti-glare layer comprises a polymer and a cured resin, and the weight ratio of the former relative to the latter is 5/95 to 60/40.

14. An anti-glare film according to claim 1, wherein the resin layer comprises a curable fluorine-containing resin precursor, and the precursor is cured with at least one curing means selected from the group consisting of an actinic ray and a thermal source.

15. An anti-glare film according to claim 1, wherein the anti-glare layer and the resin layer are formed on a transparent support in this order.

16. An anti-glare film according to claim 15, wherein the transparent support comprises a transparent polymer film for forming an optical member.

17. An anti-glare film according to claim 1, which is used for at least one display device or apparatus selected from the group consisting of a liquid crystal display device or apparatus, a plasma display and a touch panel-equipped input device.

18. An optical member in which a film recited in claim 1 is laminated on at least one side of a polarizing plate.

* * * * *